(12) United States Patent
Shi et al.

(10) Patent No.: US 10,705,262 B2
(45) Date of Patent: Jul. 7, 2020

(54) LIQUID CRYSTAL HALF-WAVE PLATE LENS

(71) Applicant: FACEBOOK TECHNOLOGIES, LLC, Menlo Park, CA (US)

(72) Inventors: Jianru Shi, Union City, CA (US); Mary Lou Jepsen, Sausalito, CA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 16/355,490

(22) Filed: Mar. 15, 2019

(65) Prior Publication Data
US 2019/0212477 A1    Jul. 11, 2019

Related U.S. Application Data

(62) Division of application No. 15/226,820, filed on Aug. 2, 2016, now Pat. No. 10,247,858.

(Continued)

(51) Int. Cl.
*G02F 1/29* (2006.01)
*G02B 3/00* (2006.01)
(Continued)

(52) U.S. Cl.
CPC ......... *G02B 3/0043* (2013.01); *G02B 3/0056* (2013.01); *G02B 3/0062* (2013.01); *G02B 27/017* (2013.01); *G02B 27/0172* (2013.01); *G02B 27/0176* (2013.01); *G02F 1/29* (2013.01); *G06F 1/163* (2013.01); *G06F 3/011* (2013.01);
(Continued)

(58) Field of Classification Search
CPC .................. G02B 3/0043; G02F 1/29
See application file for complete search history.

(56) References Cited

U.S. PATENT DOCUMENTS

| 4,769,750 A | 9/1988 | Matsumoto et al. |
| 5,016,282 A | 5/1991 | Tomono et al. |

(Continued)

FOREIGN PATENT DOCUMENTS

| JP | 57207217 A | 12/1982 |
| WO | WO20130144311 A1 | 10/2013 |

OTHER PUBLICATIONS

Blais, Francois, "Review of 20 years of range sensor development," Journal of Electronic Imaging, Jan. 2004, vol. 13(1), pp. 231-243.

(Continued)

*Primary Examiner* — Edmond C Lau
(74) *Attorney, Agent, or Firm* — Morgan, Lewis & Bockius LLP

(57) ABSTRACT

A lens includes immobilized liquid crystals. The liquid crystals in a first region are aligned in a first orientation. The liquid crystals in a second region, located between the first region and a third region and adjacent to the first region and the third region, are aligned in a second orientation that is distinct from the first orientation. The liquid crystals in the third region, located between the second region and a fourth region and adjacent to the second region and the fourth region, are aligned in the first orientation. The liquid crystals in the fourth region, located adjacent to the third region, are aligned in the second orientation. A device with the lens and an array of light emitting devices is also disclosed.

10 Claims, 10 Drawing Sheets

Related U.S. Application Data

(60) Provisional application No. 62/246,117, filed on Oct. 25, 2015.

(51) Int. Cl.
  *G02B 27/01* (2006.01)
  *G06F 1/16* (2006.01)
  *G06F 3/01* (2006.01)

(52) U.S. Cl.
  CPC ...... *G06F 3/013* (2013.01); *G02B 2027/0118* (2013.01); *G02B 2027/0123* (2013.01); *G02B 2027/0178* (2013.01); *G02F 2001/294* (2013.01)

(56) References Cited

U.S. PATENT DOCUMENTS

| | | |
|---|---|---|
| 5,414,559 A | 5/1995 | Burghardt et al. |
| 5,619,373 A | 4/1997 | Meyerhofer et al. |
| 5,742,262 A | 4/1998 | Tabata et al. |
| 5,748,375 A | 5/1998 | Yamana |
| 5,758,940 A | 6/1998 | Ogino et al. |
| 5,883,606 A | 3/1999 | Smoot |
| 6,133,687 A | 10/2000 | Clarke |
| 6,140,980 A | 10/2000 | Spitzer et al. |
| 6,215,593 B1 | 4/2001 | Bruce |
| 6,381,072 B1 | 4/2002 | Burger |
| 7,573,640 B2 | 8/2009 | Nivon et al. |
| 7,701,648 B2 | 4/2010 | Amano et al. |
| 8,218,212 B2 | 7/2012 | Kroll et al. |
| 8,611,004 B2 | 12/2013 | Newell |
| 8,941,932 B2 | 1/2015 | Kamiyarma et al. |
| 9,335,548 B1 | 5/2016 | Cakmakci et al. |
| 9,810,909 B2 | 11/2017 | Kang et al. |
| 2001/0043163 A1 | 11/2001 | Waldern et al. |
| 2002/0033442 A1 | 3/2002 | Toko |
| 2002/0158813 A1 | 10/2002 | Kiyokawa |
| 2003/0025881 A1 | 2/2003 | Hwang |
| 2004/0108971 A1 | 6/2004 | Waldern et al. |
| 2004/0227703 A1 | 11/2004 | Lamvik et al. |
| 2004/0252277 A1 | 12/2004 | Chmielewski |
| 2005/0142303 A1 | 6/2005 | Ota |
| 2006/0050398 A1 | 3/2006 | Gurevich |
| 2006/0066785 A1 | 3/2006 | Moriya |
| 2006/0103924 A1 | 5/2006 | Katz |
| 2007/0035829 A1 | 2/2007 | Woodgate et al. |
| 2007/0159599 A1 | 7/2007 | Yamada |
| 2007/0252074 A1 | 11/2007 | Ng |
| 2008/0106489 A1 | 5/2008 | Brown et al. |
| 2008/0239420 A1 | 10/2008 | McGrew |
| 2008/0297898 A1 | 12/2008 | Martin |
| 2009/0021716 A1 | 1/2009 | Wangler et al. |
| 2009/0052838 A1 | 2/2009 | McDowall et al. |
| 2009/0128899 A1 | 5/2009 | Newell |
| 2009/0296188 A1 | 12/2009 | Jain et al. |
| 2010/0141905 A1 | 6/2010 | Burke |
| 2011/0025955 A1 | 2/2011 | Bos et al. |
| 2011/0057930 A1 | 3/2011 | Keller |
| 2011/0069254 A1* | 3/2011 | Takama ............... G02B 3/14 349/62 |
| 2011/0249452 A1 | 10/2011 | Chen et al. |
| 2012/0075569 A1 | 3/2012 | Chang et al. |
| 2012/0188467 A1 | 7/2012 | Escuti et al. |
| 2012/0194419 A1* | 8/2012 | Osterhout .......... G02B 27/0093 345/156 |
| 2012/0242615 A1 | 9/2012 | Teraguchi et al. |
| 2013/0021226 A1 | 1/2013 | Bell |
| 2013/0038935 A1 | 2/2013 | Moussa et al. |
| 2013/0107145 A1 | 5/2013 | Ueki et al. |
| 2013/0114850 A1 | 5/2013 | Publicover et al. |
| 2013/0187836 A1 | 7/2013 | Cheng et al. |
| 2013/0214301 A1 | 8/2013 | Yamada |
| 2013/0218270 A1 | 8/2013 | Blanckaert et al. |
| 2013/0234935 A1 | 9/2013 | Griffith |
| 2013/0242555 A1 | 9/2013 | Mukawa |
| 2013/0286053 A1 | 10/2013 | Fleck et al. |
| 2013/0335795 A1 | 12/2013 | Song et al. |
| 2014/0085865 A1 | 3/2014 | Yun et al. |
| 2014/0118829 A1 | 5/2014 | Ma et al. |
| 2014/0140653 A1 | 5/2014 | Brown et al. |
| 2014/0168034 A1 | 6/2014 | Luebke et al. |
| 2014/0240342 A1 | 8/2014 | Xu et al. |
| 2014/0267205 A1 | 9/2014 | Nestorovic |
| 2014/0267958 A1* | 9/2014 | Sugita ............... G02B 27/2214 349/15 |
| 2014/0361957 A1 | 12/2014 | Hua et al. |
| 2014/0375541 A1 | 12/2014 | Nister et al. |
| 2014/0375913 A1 | 12/2014 | Jen et al. |
| 2015/0015814 A1 | 1/2015 | Qin |
| 2015/0049390 A1 | 2/2015 | Lanman et al. |
| 2015/0077618 A1 | 3/2015 | Ueno |
| 2015/0085259 A1 | 3/2015 | Schreiber et al. |
| 2015/0091789 A1 | 4/2015 | Alzate |
| 2015/0124315 A1 | 5/2015 | Sasahara |
| 2015/0138451 A1 | 5/2015 | Amitai |
| 2015/0173846 A1 | 6/2015 | Schneider |
| 2015/0185699 A1 | 7/2015 | Yamamoto et al. |
| 2015/0205014 A1 | 7/2015 | Akasaka |
| 2015/0205132 A1 | 7/2015 | Osterhout |
| 2015/0262424 A1 | 9/2015 | Tabaka et al. |
| 2015/0287206 A1 | 10/2015 | Ebisawa |
| 2015/0312558 A1 | 10/2015 | Miller et al. |
| 2015/0338660 A1 | 11/2015 | Mukawa |
| 2016/0018645 A1 | 1/2016 | Haddick |
| 2016/0033769 A1 | 2/2016 | Kang et al. |
| 2016/0062121 A1 | 3/2016 | Border et al. |
| 2016/0091715 A1 | 3/2016 | Larson et al. |
| 2016/0131918 A1 | 5/2016 | Chu et al. |
| 2016/0147074 A1 | 5/2016 | Kobayashi et al. |
| 2016/0165151 A1 | 6/2016 | Corlett |
| 2016/0191890 A1 | 6/2016 | Kawano et al. |
| 2016/0259198 A1* | 9/2016 | Yi ..................... G02F 1/134309 |
| 2016/0274365 A1 | 9/2016 | Bailey |
| 2016/0314564 A1 | 10/2016 | Jones et al. |
| 2016/0327798 A1 | 11/2016 | Xiao |
| 2016/0349414 A1 | 12/2016 | Rudmann et al. |
| 2017/0010473 A1 | 1/2017 | Ide |
| 2017/0010488 A1 | 1/2017 | Klug et al. |
| 2017/0018215 A1 | 1/2017 | Black et al. |
| 2017/0018688 A1 | 1/2017 | Mazed et al. |
| 2017/0019602 A1 | 1/2017 | Dopilka et al. |
| 2017/0031435 A1 | 2/2017 | Raffle et al. |
| 2017/0038589 A1 | 2/2017 | Jepsen |
| 2017/0038590 A1 | 2/2017 | Jepsen |
| 2017/0038591 A1 | 2/2017 | Jepsen |
| 2017/0038834 A1 | 2/2017 | Wilson et al. |
| 2017/0038836 A1 | 2/2017 | Jepsen et al. |
| 2017/0039904 A1 | 2/2017 | Jepsen |
| 2017/0039905 A1 | 2/2017 | Jepsen et al. |
| 2017/0039906 A1 | 2/2017 | Jepsen |
| 2017/0039907 A1 | 2/2017 | Jepsen |
| 2017/0039960 A1 | 2/2017 | Jepsen |
| 2017/0075421 A1 | 3/2017 | Na et al. |
| 2017/0091549 A1 | 3/2017 | Gustafsson et al. |
| 2017/0102543 A1 | 4/2017 | Vallius |
| 2017/0108697 A1 | 4/2017 | Ei-Ghoroury et al. |
| 2017/0139213 A1 | 5/2017 | Schmidtlin |
| 2017/0293148 A1 | 10/2017 | Park et al. |
| 2017/0336626 A1 | 11/2017 | Hayashi et al. |
| 2018/0046859 A1 | 2/2018 | Jarvenpaa |

OTHER PUBLICATIONS

Jepsen, Office Action, U.S. Appl. No. 15/065,772, dated Jun. 29, 2017, 16 pgs.

Jepsen, Final Office Action, U.S. Appl. No. 15/065,772, dated Nov. 3, 2017, 16 pgs.

Jepsen, Notice of Allowance, U.S. Appl. No. 15/065,772, dated Jan. 29, 2018, 8 pgs.

Jepsen, Office Action, U.S. Appl. No. 15/065,778, dated Oct. 27, 2017, 29 pgs.

(56) References Cited

OTHER PUBLICATIONS

Jepsen, Notice of Allowance, U.S. Appl. No. 15/065,778, dated Apr. 9, 2018, 12 pgs.
Jepsen, Office Action, U.S. Appl. No. 15/065,780, dated Oct. 27, 2017, 20 pgs.
Jepsen, Final Office Action, U.S. Appl. No. 15/065,780, dated Mar. 28, 2018, 17 pgs.
Jepsen, Office Action, U.S. Appl. No. 15/065,780, dated Jul. 9, 2018, 21 pgs.
Jepsen, Final Office Action, U.S. Appl. No. 15/065,780, dated Dec. 4, 2018, 23 pgs.
Jepsen, Office Action, U.S. Appl. No. 15/065,785, dated Oct. 27, 2017, 21 pgs.
Jepsen, Final Office Action, U.S. Appl. No. 15/065,785, dated Mar. 28, 2018, 17 pgs.
Jepsen, Office Action, U.S. Appl. No. 15/065,785, dated Sep. 13, 2018, 21 pgs.
Jepsen, Notice of Allowance, U.S. Appl. No. 15/065,785, dated Apr. 24, 2019, 12 pgs.
Jepsen, Office Action, U.S. Appl. No. 15/065,817, dated Mar. 29, 2018, 11 pgs.
Jepsen, Office Action, U.S. Appl. No. 15/065,817, dated Dec. 27, 2018, 11 pgs.
Jepsen, Office Action, U.S. Appl. No. 15/065,790, dated Nov. 8, 2017, 24 pgs.
Jepsen, Final Office Action, U.S. Appl. No. 15/065,790, dated Apr. 18, 2018, 17 pgs.
Jepsen, Notice of Allowance, U.S. Appl. No. 15/065,790, dated Aug. 15, 2018, 13 pgs.
Jepsen, Office Action, U.S. Appl. No. 15/065,796, dated Nov. 8, 2017, 26 pgs.
Jepsen, Final Office Action, U.S. Appl. No. 15/065,796, dated Apr. 26, 2018, 22 pgs.
Jepsen, Office Action, U.S. Appl. No. 15/065,796, dated Sep. 13, 2018, 24 pgs.
Jepsen, Final Office Action, U.S. Appl. No. 15/065,796, dated Apr. 25, 2019, 25 pgs.
Jepsen, Office Action, U.S. Appl. No. 15/065,811, dated May 11, 2018, 17 pgs.
Jepsen, Final Office Action, U.S. Appl. No. 15/065,811, dated Dec. 13, 2018, 8 pgs.
Jepsen, Notice of Allowance, U.S. Appl. No. 15/065,811, dated Feb. 13, 2019, 9 pgs.
Jepsen, Office Action, U.S. Appl. No. 15/065,813, dated May 17, 2018, 12 pgs.
Jepsen, Final Office Action, U.S. Appl. No. 15/065,813, dated Dec. 18, 2018, 15 pgs.
Jepsen, Office Action, U.S. Appl. No. 15/065,813, dated Apr. 1, 2019, 15 pgs.
Jepsen, Office Action, U.S. Appl. No. 15/967,451, dated Jun. 15, 2018, 13 pgs.
Jepsen, Final Office Action, U.S. Appl. No. 15/967,451, dated Oct. 11, 2018, 17 pgs.
Jepsen, Notice of Allowance, U.S. Appl. No. 15/967,451, dated Feb. 25, 2019, 9 pgs.
Lanman et al., "Near-Eye Light Field Displays," ACM Transactions on Graphics, vol. 32, No. 6, Article 220, Publication Date: Nov. 2013, 10 pgs.
Shi, Office Action, U.S. Appl. No. 15/347,684, dated Jun. 29, 2017, 13 pgs.
Shi, Final Office Action, U.S. Appl. No. 15/347,684, dated Nov. 6, 2017, 12 pgs.
Shi, Office Action, U.S. Appl. No. 15/347,684, dated Jul 11, 2018, 11 pgs.
Shi, Notice of Allowance, U.S. Appl. No. 15/347,684, dated Jan. 7, 2019, 7 pgs.
Shi, Notice of Allowance, U.S. Appl. No. 15/347,684, dated Jan. 24, 2018, 5 pgs.
Shi, Office Action, U.S. Appl. No. 15/226,815, dated Apr. 5, 2018, 15 pgs.
Shi, Notice of Allowance, U.S. Appl. No. 15/226,815, dated Sep. 24, 2018, 9 pgs.
Shi, Office Action, U.S. Appl. No. 15/226,820, dated Mar. 28, 2018, 10 pgs.
Shi, Final Office Action, U.S. Appl. No. 15/226,820, dated Aug. 6, 2018, 13 pgs.
Shi, Notice of Allowance, U.S. Appl. No. 15/226,820, dated Nov. 19, 2018, 10 pgs.
Shi, Office Action, U.S. Appl. No. 15/347,685, dated Jun. 26, 2018, 11 pgs.
Shi, Notice of Allowance, U.S. Appl. No. 15/347,685, dated May 2, 2019, 7 pgs.
Shi, Office Action, U.S. Appl. No. 15/347,691, dated Nov. 1, 2018, 10 pgs.
Shi, Notice of Allowance, U.S. Appl. No. 15/347,691, dated Feb. 27, 2019, 7 pgs.
Shi, Office Action, U.S. Appl. No. 15/347,672, dated Feb. 21, 2019, 12 pgs.
Schmidtlin, Office Action, U.S. Appl. No. 15/270,803, dated Nov. 29, 2017, 26 pgs.
Schmidtlin, Notice of Allowance, U.S. Appl. No. 15/270,803, dated May 2, 2018, 11 pgs.
Shroff, Office Action, U.S. Appl. No. 15/395,107, dated May 14, 2018, 11 pgs.
Shroff, Final Office Action, U.S. Appl. No. 15/395,107, dated Dec. 12, 2018, 13 pgs.
Shroff, Office Action, U.S. Appl. No. 15/395,107, dated Mar. 15, 2019, 15 pgs.
Schmidtlin, Office Action, U.S. Appl. No. 15/422,403, dated Sep. 19, 2018, 21 pgs.
Schmidtlin, Final Office Action, U.S. Appl. No. 15/422,403, dated Jan. 29, 2019, 24 pgs.
Schmidtlin, Notice of Allowance, U.S. Appl. No. 15/422,403, dated May 30, 2019, 10 pgs.

\* cited by examiner

LIQUID CRYSTAL HALF-WAVE PLATE LENS

RELATED APPLICATIONS

This application is a divisional application of U.S. patent application Ser. No. 15/226,820 filed Aug. 2, 2016, which claims the benefit of, and priority to, U.S. Provisional Patent Application Ser. No. 62/246,117, filed Oct. 25, 2015. All of these applications are incorporated by reference herein in their entireties.

This application is related to U.S. patent application Ser. No. 15/065,772, filed Mar. 9, 2016, which is incorporated by reference herein in its entirety.

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

The above deficiencies and other problems associated with conventional lenses are reduced or eliminated by the disclosed lens. Lenses are critical components in head-mounted displays. High-performance lenses or lens assemblies can be large and heavy. The disclosed lenses are compact and light-weighted while providing performance comparable to that of larger lenses.

In some embodiments, the lens is included in a display device. In some embodiments, the device is a head-mounted display device. In some embodiments, the device is portable.

In accordance with some embodiments, a lens includes immobilized liquid crystals. The liquid crystals in a first region are aligned in a first orientation. The liquid crystals in a second region, located between the first region and a third region and adjacent to the first region and the third region, are aligned in a second orientation that is distinct from the first orientation. The liquid crystals in the third region, located between the second region and a fourth region and adjacent to the second region and the fourth region, are aligned in the first orientation. The liquid crystals in the fourth region, located adjacent to the third region, are aligned in the second orientation.

In accordance with some embodiments, a method for making a lens includes applying a respective pattern of an electric field on a liquid containing liquid crystals so that the liquid crystals are aligned to focus at least a portion of impinging light. The liquid containing liquid crystals is located between two substrates. Each substrate of the two substrates includes a plurality of electrodes. The liquid crystals in a first region are aligned in a first orientation. The liquid crystals in a second region, located between the first region and a third region and adjacent to the first region and the third region, are aligned in a second orientation that is distinct from the first orientation. The liquid crystals in the third region, located between the second region and a fourth region and adjacent to the second region and the fourth region, are aligned in the first orientation. The liquid crystals in the fourth region, located adjacent to the third region, are aligned in the second orientation.

Thus, the disclosed embodiments provide compact and light weight display devices with increased efficiency, effectiveness, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
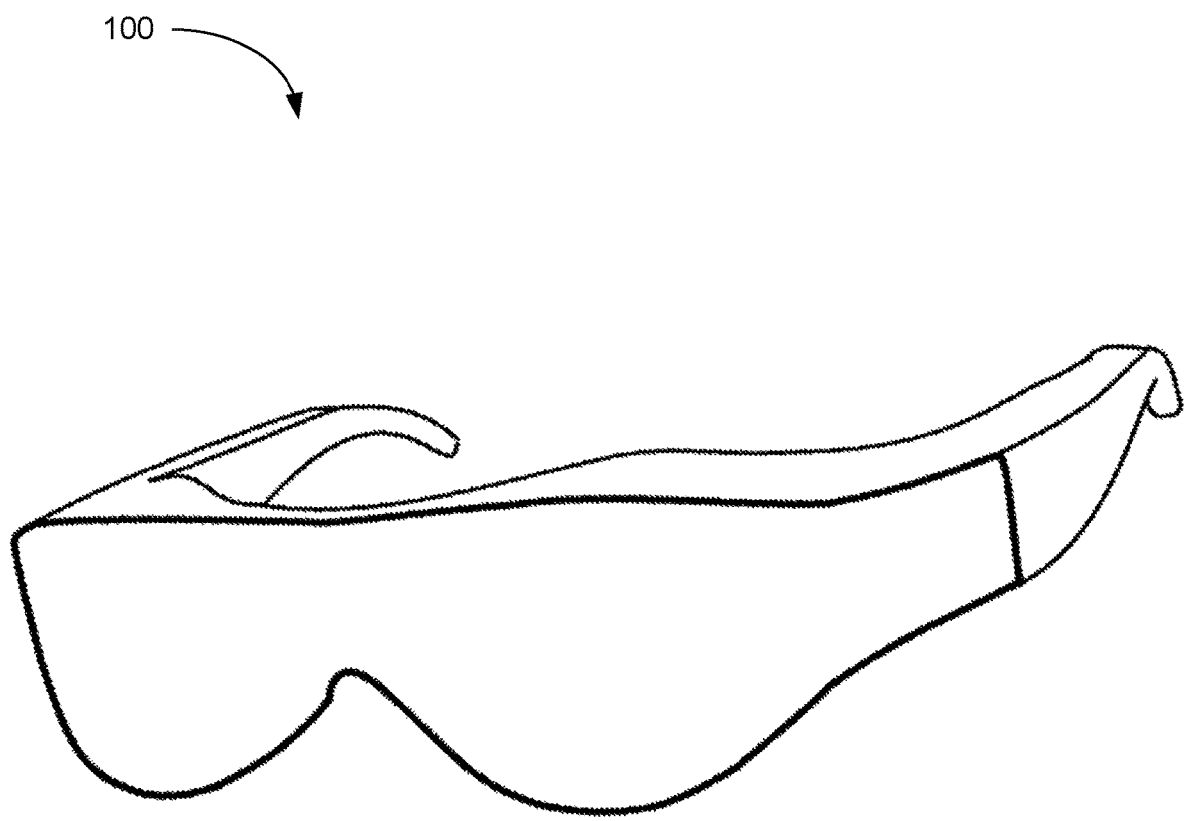
FIG. 1A is a perspective view of a display device in accordance with some embodiments.

These figures are not drawn to scale unless indicated otherwise.

DETAILED DESCRIPTION

Conventional head-mounted displays are larger and heavier than typical eyeglasses, because conventional head-mounted displays often include a complex set of optics. Head-mounted displays often include optical elements that are located close to one another. This often requires lenses with a large diameter and a short focal length (also called herein a low F/# lens). Such lenses can bulky and heavy. It is not easy for users to get used to wearing such large and heavy head-mounted displays.

The disclosed embodiments, by utilizing a liquid crystal half-wave plate lens, provide display devices (including those that can be head-mounted) that are compact and light. Liquid crystal half-wave plate lenses can provide apertures and focal lengths comparable to those of conventional lenses. Because liquid crystal half-wave plate lenses can be made thinner and lighter than conventional lenses of similar performance features (e.g., aperture and/or focal length), replacing conventional lenses in head-mounted displays with liquid crystal half-wave plate lenses can reduce the size and weight of the head-mounted displays. In some embodiments, liquid crystal half-wave plate lenses are used in conjunction with conventional lenses (e.g., conventional spherical lenses, conventional aspheric lenses, and/or Fresnel lenses) to complement the conventional lenses.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first region could be termed a second region, and, similarly, a second region could be termed a first region, without departing from the scope of the various described embodiments. The first region and the second region are both regions, but they are not the same regions.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1A illustrates display device 100 in accordance with some embodiments. In some embodiments, display device 100 is configured to be worn on a head of a user (e.g., by having the form of spectacles or eyeglasses, as shown in FIG. 1A) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 1B. In some embodiments, display device 100 includes additional components not shown in FIG. 1B.

Figure 1B:
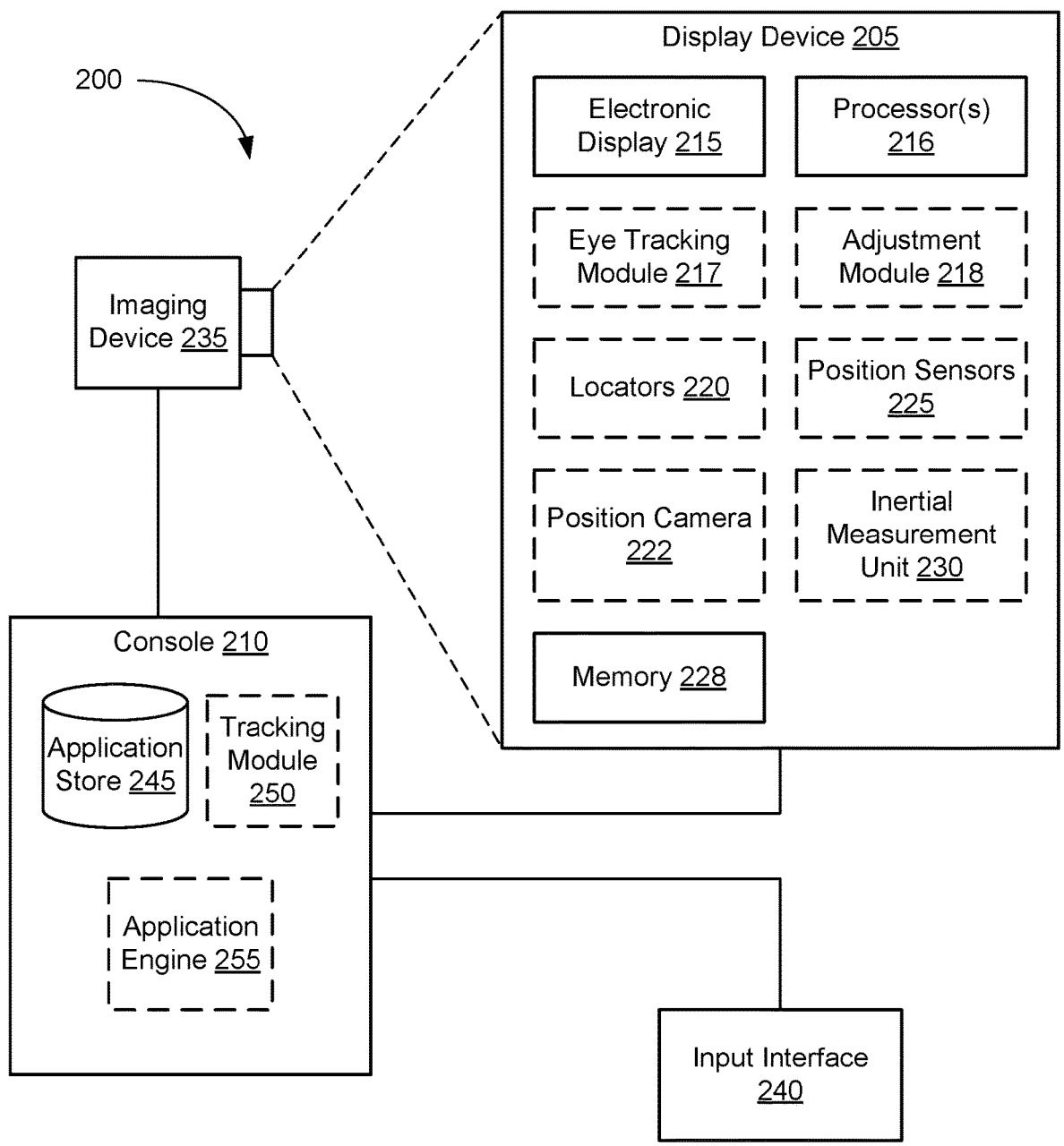
FIG. 1B is a block diagram of a system including a display device in accordance with some embodiments.

FIG. 1B is a block diagram of system 200 in accordance with some embodiments. The system 200 shown in FIG. 1B includes display device 205 (which corresponds to display device 100 shown in FIG. 1A), imaging device 235, and input interface 240 that are each coupled to console 210. While FIG. 1B shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1A, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 1B, console 210 includes application store 245, tracking module 250, and application engine 255. Some embodiments of console 210 have different modules than those described in conjunction with FIG. 1B. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 2A:
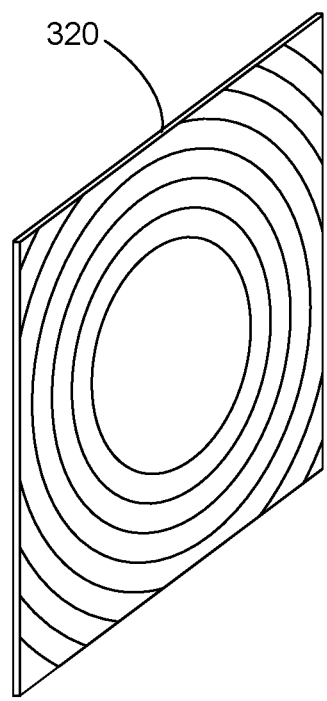
FIG. 2A is an isometric view of a liquid crystal lens in accordance with some embodiments.

FIG. 2A is an isometric view of liquid crystal lens 320 in accordance with some embodiments. Lens 320 in FIG. 2A includes different regions arranged in a plurality of concentric rings. Although the concentric rings are illustrated in FIG. 2A, the concentric rings may not be visible to a user due to the size (e.g., a narrow width) of each region and/or a limited visible contrast between each region and neighboring regions.

Although FIG. 2A illustrates a lens that is axisymmetric, a person having ordinary skill in the art would understand that principles described herein can apply to cylindrical lenses.

Figure 2B:
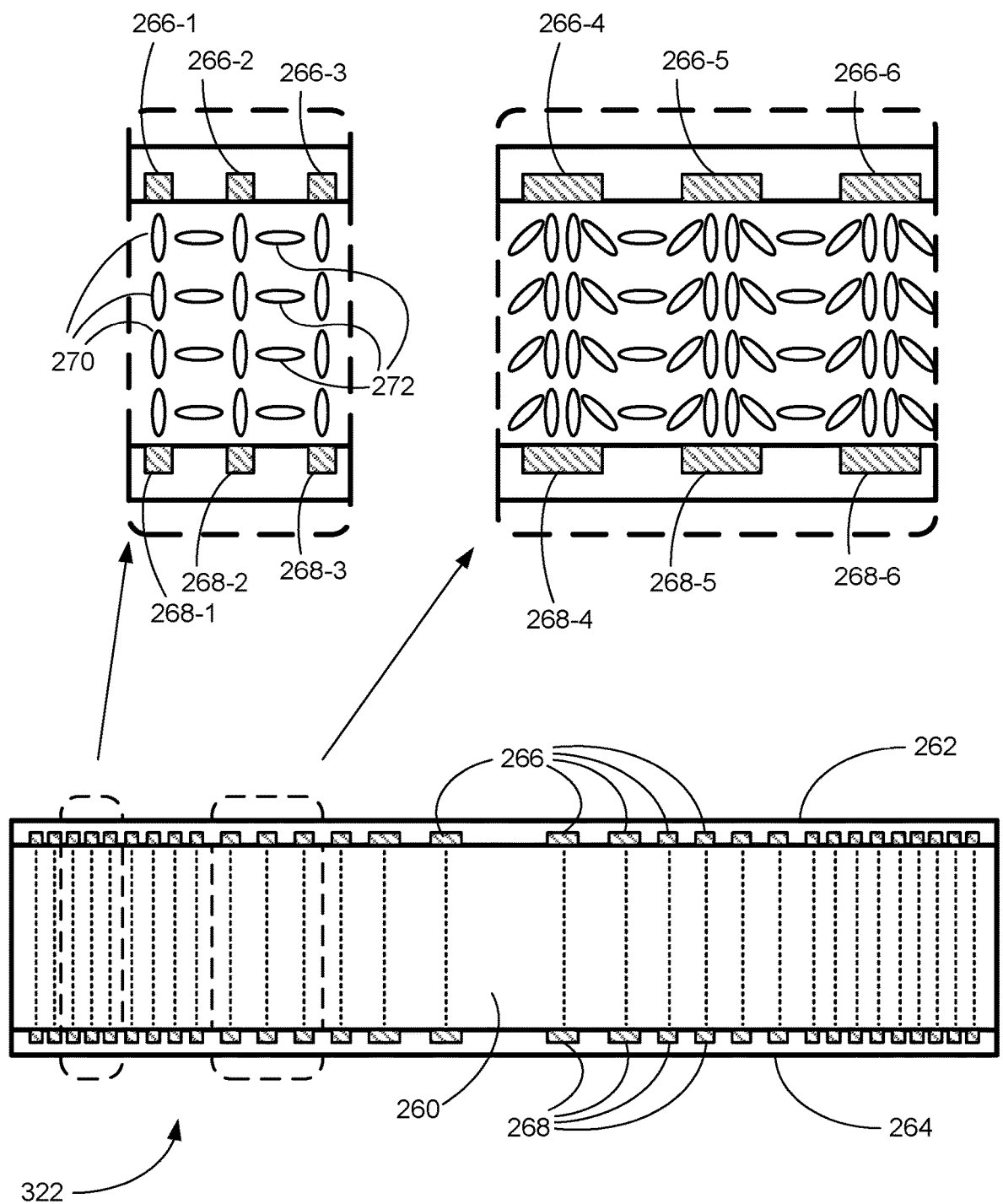
FIG. 2B is a schematic diagram illustrating a method for making a liquid crystal lens in accordance with some embodiments.

FIG. 2B is a schematic diagram illustrating a method for making a liquid crystal lens 322 in accordance with some embodiments.

In FIG. 2B, liquid 260 containing liquid crystals is located between first substrate 262 and second substrate 264. First substrate 262 includes a plurality of electrodes 266, and second substrate 264 includes a plurality of electrodes 268. In some embodiments, first substrate 262 and second substrate 264 are made of optically transparent material (e.g., glass, fused silica, sapphire, etc.). In some embodiments, at least one of first substrate 262 and second substrate 264 is not optically transparent (e.g., opaque or translucent). In some embodiments, at least one of first substrate 262 and second substrate 264 has a reflective surface. In some embodiments, the plurality of electrodes 266 and/or the plurality of electrodes 268 are made with optically transparent material (e.g., indium tin oxide). In some embodiments, the plurality of electrodes 266 and/or the plurality of electrodes 268 are not optically transparent.

A voltage differential is applied between the plurality of electrodes 266 on first substrate 262 and the plurality of electrodes 268 on second substrate 264, which create a pattern of an electric field on liquid 260. As shown in FIG. 2B, liquid crystals in liquid 260 are aligned. For example, as shown in FIG. 2B, liquid crystals located between each pair of electrodes 266 and 268 (e.g., electrodes 266-1 and 268-1, electrodes 266-2 and 268-2, electrodes 266-3 and 268-3, electrodes 266-4 and 268-4, electrodes 266-5 and 268-5, and electrodes 266-6 and 268-6) are aligned in a first orientation. For example, liquid crystals 270 located between electrode 266-1 and 268-1 (e.g., a low index region) are aligned vertically. Similarly, liquid crystals 270 located between 266-2 and 268-2 (e.g., a low index region) are aligned vertically. Liquid crystals located offset from each pair of electrodes 266 and 268 are aligned in a second orientation that is distinct from the first orientation. For example, liquid crystals 272 located between a plane defined by electrodes 266-2 and 268-2 and a plane defined by electrodes 266-3 and 268-3 (e.g., a high index region) are aligned horizontally. Similarly, liquid crystals 272 located between a plane defined by electrodes 266-1 and 268-1 and a plane defined by electrodes 266-2 and 268-2 (e.g., a high index region) are aligned horizontally. This alternating pattern in the orientation of liquid crystals repeats across liquid 260.

Liquid crystals are birefringent. For example, a refractive index of a liquid crystal depends on an orientation of the liquid crystal. A uniaxial liquid crystal has an ordinary refractive index along an optical axis and an extraordinary refractive index, that is distinct from the ordinary refractive index, along a direction that is perpendicular to the optical axis. Thus, when the voltage differential is applied, liquid crystals located between two pairing electrodes have a first refractive index (e.g., the ordinary refractive index) and liquid crystals located between a plane defined by two pairing electrodes and a plane defined by two adjacent pairing electrodes have a second refractive index (e.g., the extraordinary refractive index). In some embodiments, the phase difference between light passing through the high index region and light passing through the low index region corresponds to $\pi$, which in turn corresponds to a half wavelength (e.g., $\lambda/2$).

Figure 2C:
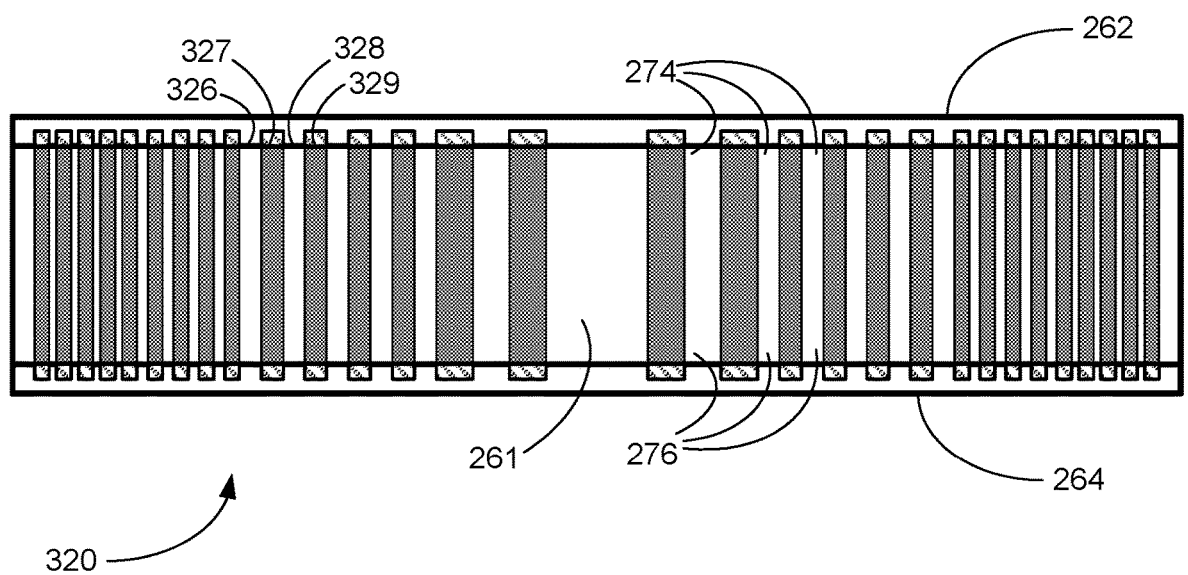
FIG. 2C is a schematic diagram illustrating a cross-sectional view of a liquid crystal lens in accordance with some embodiments.

FIG. 2C is a schematic diagram illustrating a cross-sectional view of liquid crystal lens 320 in accordance with some embodiments. In FIG. 2C, liquid crystals are immobilized to form a structure with regions of alternating refractive indices (e.g., high index region 326, low index region 327, high index region 328, and low index region 329).

In some embodiments, liquid crystals in liquid 260 shown in FIG. 2B are liquid crystal monomers. By polymerizing the liquid crystal monomers, the liquid crystals are immobilized (or the mobility of the liquid crystals is reduced). For example, the liquid crystal monomers can be polymerized by exposing the liquid crystal monomers to ultraviolet light, which is called photopolymerization.

In some embodiments, liquid 260 containing liquid crystals also include monomers that are distinct from liquid crystals. By polymerizing the monomers, the liquid crystals are immobilized (or the mobility of the liquid crystals is reduced). For example, the monomers can be polymerized by exposing the monomers to ultraviolet light.

Figure 2D:
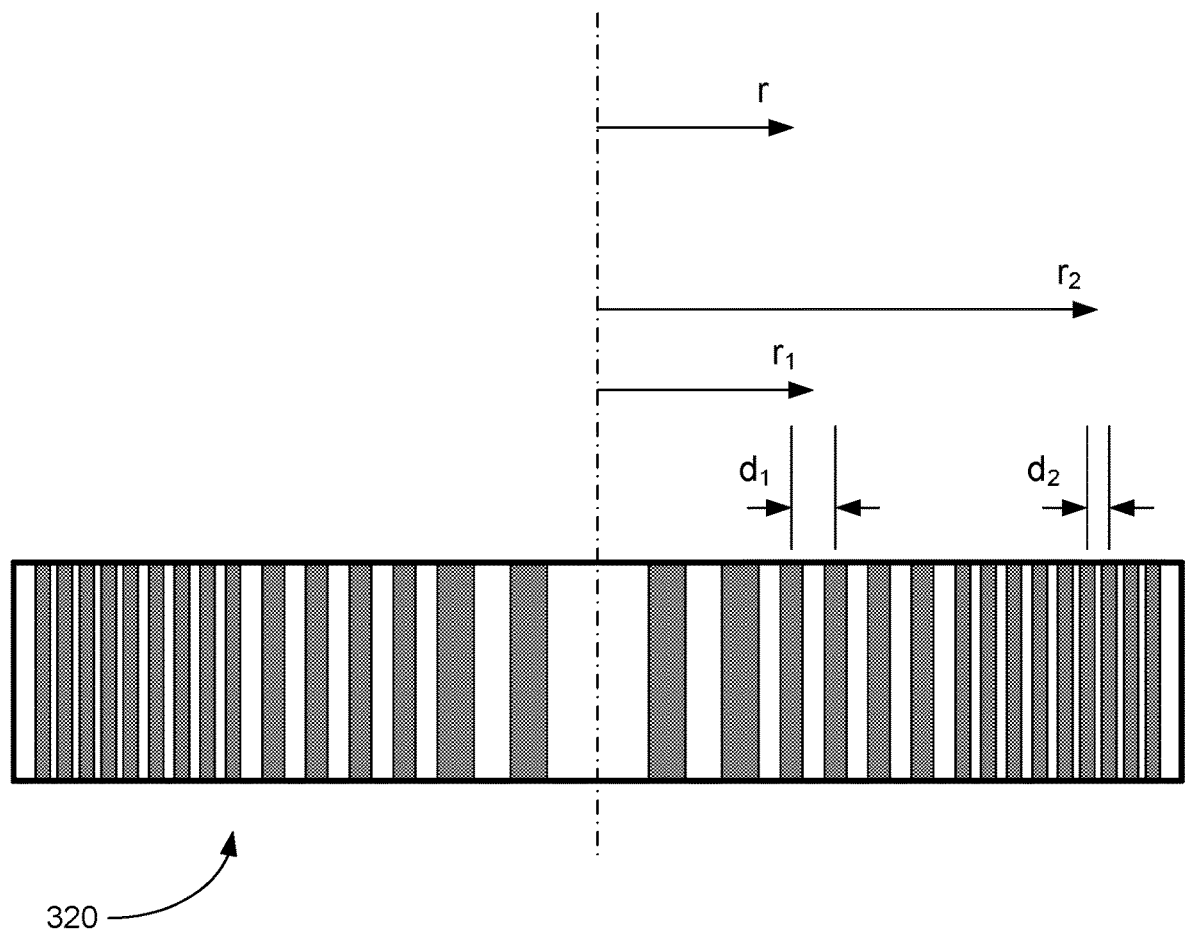
FIG. 2D is a schematic diagram illustrating spacing of regions in the liquid crystal lens shown in FIG. 2C.

FIG. 2D is a schematic diagram illustrating spacing (also called herein a pitch) of regions in the liquid crystal lens shown in FIG. 2C. In FIG. 2C, first substrate 262 and second substrate 264 illustrated in FIG. 2C have been removed.

Because lens 320 utilizes diffraction of light for focusing light, spacing between determines the direction of diffracted light. The direction of diffracted light is described by the following equation: $\theta = \arcsin(m\lambda/d)$, where $\theta$ is an angle of diffracted light, m is an order of diffraction, $\lambda$ is a wavelength of light, and d is a representative distance (e.g., spacing) between two adjacent regions. When a small diffraction angle is required, the spacing d is increased. When a large diffraction angle is required, the spacing d is reduced. For example, as shown in FIG. 2D, the spacing $d_1$ at a location close to a center of lens 320 (where a distance r from the center of lens 320 is $r_1$) is greater than the spacing $d_2$ at a location away from the center of lens 320 (which the distance from the center of lens 320 is $r_2$).

Figure 2E:
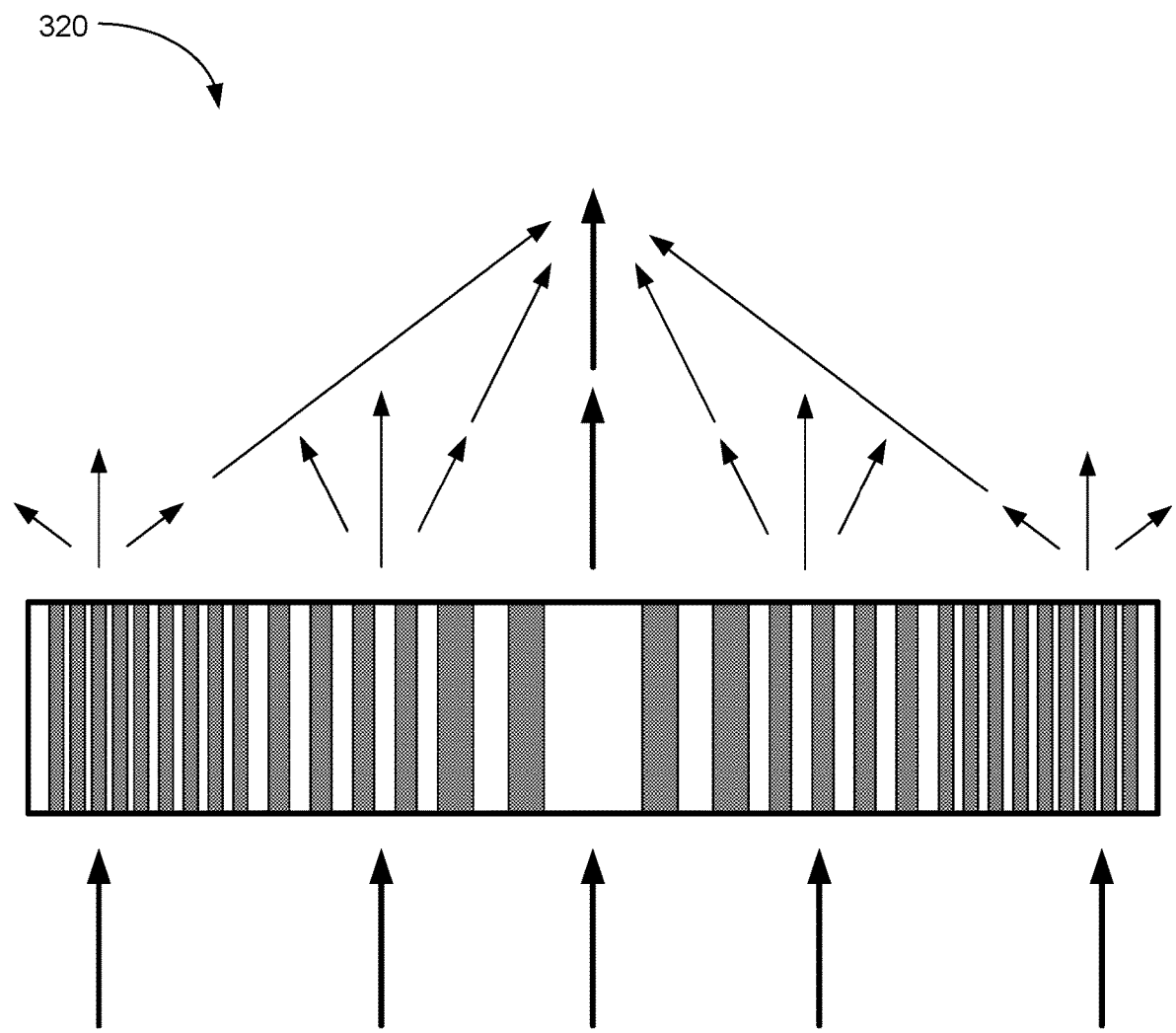
FIG. 2E is a schematic diagram illustrating propagation of light through a liquid crystal lens in accordance with some embodiments.

FIG. 2E is a schematic diagram illustrating propagation of light through a liquid crystal lens in accordance with some embodiments. In FIG. 2E, light impinging on a portion of lens 320 where the spacing is small is diffracted at a wide angle, and light impinging on a portion of lens 320 where the spacing is large is diffracted at a small angle, thereby allowing a portion of light impinging on lens 320 is focused. In some embodiments, the spacing d is selected as a function of the distance r.

FIG. 2E also illustrates that a portion of light impinging on lens 320 is diffracted away from the focal point.

Although FIG. 2E illustrates propagation of light due to the first order diffraction ($m = \pm 1$), it is possible to utilize higher order diffraction (e.g., $m > 1$) to focus light.

Figure 3A:
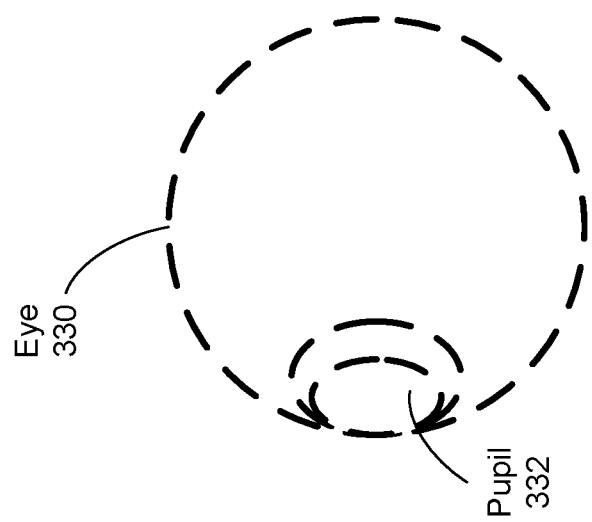
FIG. 3A is an isometric view of a display device in accordance with some embodiments.
Figure 3A:
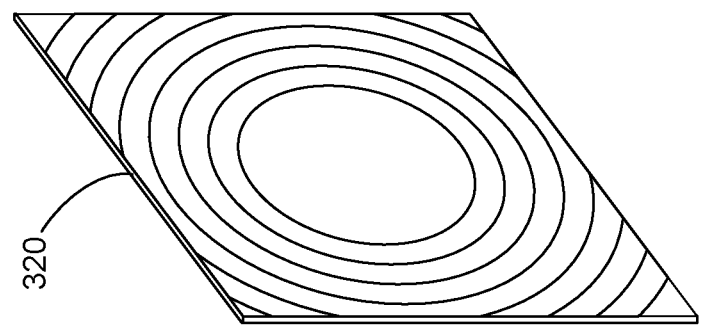
Figure 3A:
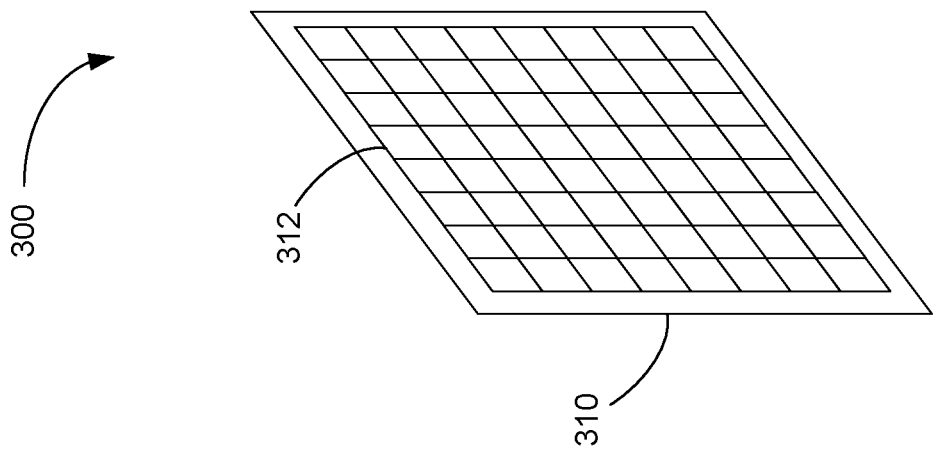

FIG. 3A is an isometric view of display device 300 in accordance with some embodiments. In some other embodiments, display device 300 is part of some other electronic display (e.g., digital microscope, etc.). In some embodiments, display device 300 includes light emission device array 310 and one or more lenses (e.g., lens 320). In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 312 that emit visible light (and optionally includes devices that emit IR light).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses (e.g., lens 320). In some embodiments, display device 300 uses the emission intensity array to facilitate providing image light to a location of pupil 332 of eye 330 of a user, and minimize the amount of image light provided to other areas in the eyebox.

In FIG. 3A, one or more lenses (e.g., lens 320) receive the modified image light (e.g., attenuated light) from the emission intensity array (or directly from emission device array 310), and directs the modified image light to a location of pupil 332. Lens 320 includes one or more diffractive optics. In some embodiments, the one or more lenses include one or more active lenses. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 may dynamically adjust the curvature and/or refractive ability of active lenslets to direct light received from the emission device array 310 to pupil 332.

An optional IR detector array detects IR light that has been retro-reflected from the retina of eye 330, a cornea of eye 330, a crystalline lens of eye 330, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 332, the display element adjusts the emitted image light such that the light output by the display element is refracted by one or more lenses (e.g., lens 320) toward the determined location of pupil 332, and not toward other locations in the eyebox.

Figure 3B:
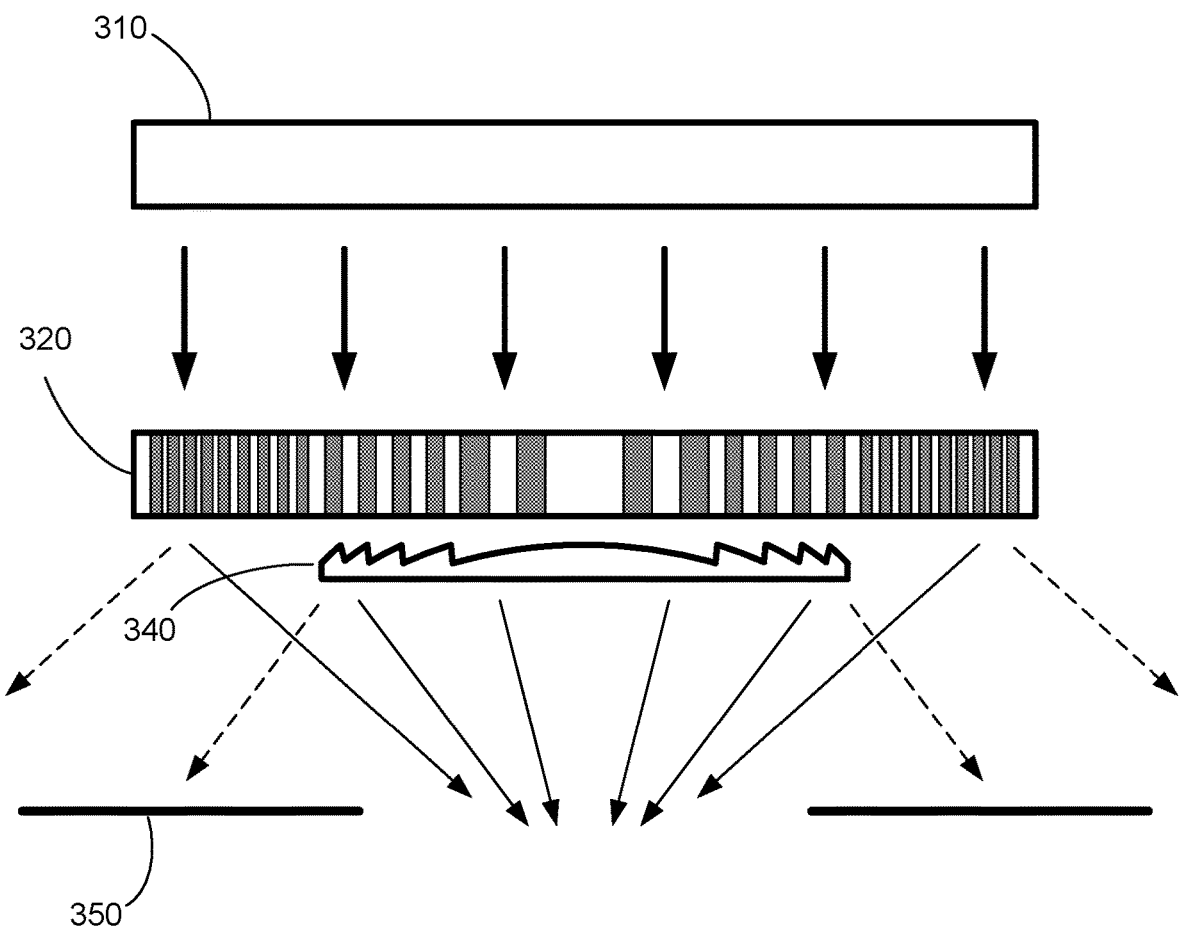
FIG. 3B is a schematic diagram illustrating a display device in accordance with some embodiments.

FIG. 3B is a schematic diagram illustrating a display device in accordance with some embodiments.

In FIG. 3B, display device 300 includes a combination of lens 320 and one or more additional lenses. For example, in FIG. 3B, Fresnel lens 340 is used in conjunction with lens 320. This allows a conventional lens (e.g., Fresnel lens 340), in conjunction with lens 320, to focus light from a central region of light emission device array 310, whereas light from a peripheral region of light emission device array 310 is focused by lens 320 only. Because the conventional lens focuses light from the central region of light emission device array 310, its size (e.g., diameter) is smaller than a single lens that covers all of the light from light emission device array 310. Thus, a higher F/# lens can be used.

Figure 3C:
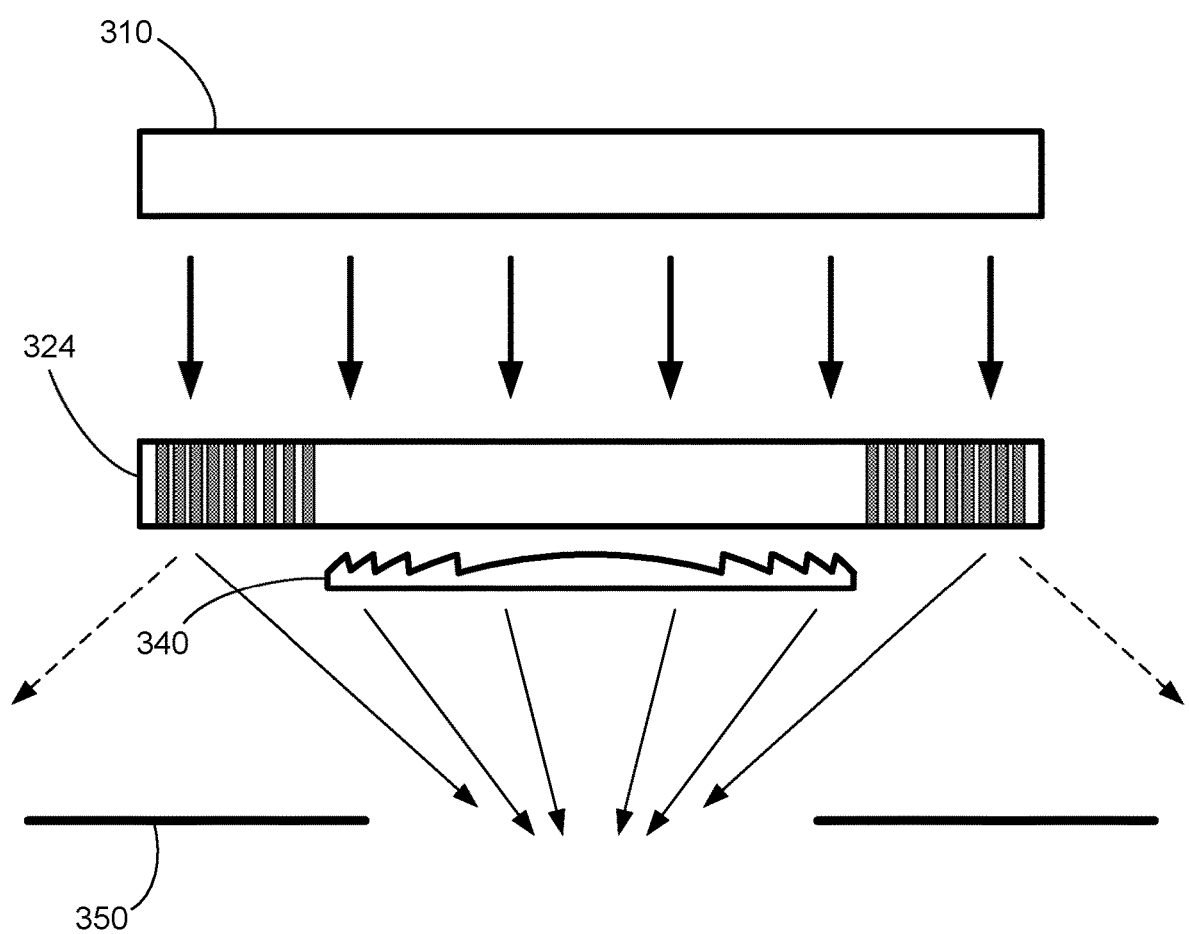
FIG. 3C is a schematic diagram illustrating a display device in accordance with some embodiments.

FIG. 3C is a schematic diagram illustrating a display device in accordance with some embodiments. FIG. 3C is similar to FIG. 3B except that a central portion of lens 324 does not include regions of different refractive indices. Thus, light from a central region of light emission device array 310 is focused by lens 340 only. Because central portion of lens 324 does not cause diffraction, the loss of light due to diffraction is reduced.

Although FIGS. 3B and 3C illustrate the use of a Fresnel lens with a liquid crystal lens, other conventional lenses (e.g., spherical or aspheric lens) can be used with the liquid crystal lens, in lieu of, or in addition to, the Fresnel lens.

In light of these principles, we now turn to certain embodiments.

In accordance with some embodiments, a method for making a lens includes applying a respective pattern of an electric field on a liquid containing liquid crystals so that the liquid crystals are aligned to focus at least a portion of impinging light (e.g., in FIG. 2B, liquid crystals in liquid 260 are aligned due to applied electric field). The liquid containing liquid crystals is located between two substrates (e.g., in FIG. 2B, liquid 260 containing liquid crystals is located between first substrate 262 and second substrate 264). Each substrate of the two substrates includes a plurality of electrodes (e.g., electrodes 266 and electrodes 268). The liquid crystals in a first region are aligned in a first orientation (e.g., liquid crystals 270). The liquid crystals in a second region, located between the first region and a third region and adjacent to the first region and the third region, are aligned in a second orientation that is distinct from the first orientation (e.g., liquid crystals 272). The liquid crystals in the third region, located between the second region and a fourth region and adjacent to the second region and the fourth region, are aligned in the first orientation (e.g., liquid crystals 270). The liquid crystals in the fourth region, located adjacent to the third region, are aligned in the second orientation (e.g., liquid crystals 272).

In some embodiments, the liquid crystals in the first region are aligned parallel to a first substrate of the two substrates. The liquid crystals in the second region are aligned perpendicular to the first substrate. The liquid crystals in the third region are aligned parallel to the first substrate. The liquid crystals in the fourth region are aligned perpendicular to the first substrate. For example, liquid crystals 270 in the first and third regions are aligned parallel to the first substrate (e.g., first substrate 262), and liquid crystals 272 in second and fourth regions are aligned vertical to the first substrate (e.g., first substrate 262).

In some embodiments, the first region has a first refractive index and the second region has a second refractive index so that the difference between the first refractive index and the second refractive index causes a half-wave phase difference for the impinging light. For example, the phase difference between light passing through the first region and light passing through the second region is (N+0.5)·2π, where N is an integer.

In some embodiments, the aligned liquid crystals are configured to focus a portion of the impinging light and disperse a portion of the impinging light (e.g., FIG. 2E).

In some embodiments, spacing between two adjacent regions in which the liquid crystals are aligned in a same orientation is determined based on a distance from a center of the substrate (e.g., FIG. 2D).

In some embodiments, two adjacent regions, in which the liquid crystals are aligned in the first orientation, located at a first distance from a center of the substrate are separated by a first spacing. Two adjacent regions, in which the liquid crystals are aligned in the first orientation, located at a second distance from the center of the substrate are separated by a second spacing. The second distance is greater than the first distance. The second spacing is less than the first spacing. For example, the spacing $d_2$ at the distance $r_2$ is less than the spacing $d_1$ at the distance $r_1$.

In some embodiments, at least one substrate is not optically transparent. For example, second substrate 264 in FIG. 2B may not be optically transparent (e.g., reflective). Both substrates need to be optically transparent, when the configuration including both substrates is to be used as a lens (e.g., an active lens that is dynamically turned on/off). However, both substrates need not be optically transparent, when the configuration shown in FIG. 2B is used for making a liquid crystal lens by immobilizing the liquid crystals. Once the liquid crystal lens is formed by immobilizing liquid crystals, the liquid crystal lens is removed from at least one substrate that is not optically transparent, for use.

In some embodiments, the method includes immobilizing the liquid crystals. For example, the liquid crystals are cured (e.g., photopolymerized). Alternatively, a matrix surrounding the liquid crystals is cured.

In some embodiments, the liquid crystals include liquid crystal monomers. Immobilizing the liquid crystals includes polymerizing the liquid crystal monomers. In some embodiments, immobilizing the liquid crystals includes photopolymerizing the liquid crystal monomers.

In some embodiments, the liquid crystal monomers are selected from a group comprising: N-(p-methoxy-o-hydroxy-benzylidene)-p-aminostyrene, N-(p-cyanobenzylidene)-p-aminostyrene, and N-(p-acryloyloxybenzylidene)-p-methoxyaniline. In some embodiments, the liquid crystal monomers are selected from a group consisting of: N-(p-methoxy-o-hydroxy-benzylidene)-p-aminostyrene, N-(p-cyanobenzylidene)-p-aminostyrene, and N-(p-acryloyloxybenzylidene)-p-methoxyaniline.

In some embodiments, the liquid crystals are selected from a group comprising aromatic and aliphatic organic compounds, such as benzylidene anilines; N-(p-alkoxybenzylidene)-p-aminostyrenes; beta-sitosterol derivatives; active amyl ester of cyano benzylidene aminocinnamate; compounds that contain p-phenylene, such as p-phenylene p-alkoxybenzoates; aminoacetophenones; aminopropiophenones; phenylene diamines; chlorophenylene diamines; terephthals; p,p'-disubstituted dibenzyls; p,p'-disubstituted stilbenes; p,p'-disubstituted diphenylacetylenes; p,p'-disubstituted 1,4-diphenylbutadiene; p,p'-disubstituted phenyl benzoate; substituted phenyl alkyl carbonates and diphenyl carbonates; p-n-alkyl benzoic acids; p-n-alkoxybenzoic acids and Schiff bases prepared from p-substituted benzaldehydes and compounds of the following types: p-phenylene diamines, 4,4'-diamino diphenyl, 4-phenylazoanilines, naphthylamines and naphthylene diamines. In some embodiments, the liquid crystals are selected from a group comprising ethyl p-4-ethoxy benzylidene aminocinnamate; diethyl ester of p,p'-azoxybenzoic acid; N-(p-methoxybenzylidene)-p-aminostyrene; N-(p-butoxybenzylidene)-p-aminostyrene; p-azoxyanisol; p-hexyloxy benzalazine; p-azoxy phenetol; p-anisylidene-p-diphenylamine; p-ethoxybenzylidene-p-diphenylamine; p-anisylidene-p-aminophenyl acetate; p-ethoxybenzylidene-p-aminophenyl acetate; p-n-hexyloxybenzylidene-p-aminophenyl acetate; deca-2,4-dienoic acid; 4,4'-di-n-heptoxy azoxybenzene; 4,4'-di-n-hexoxy azoxybenzene; 4,4'-di-n-pentoxy azoxybenzene; 4,4'-di-n-butoxy azoxybenzene; 4,4'-diethoxy azoxybenzene; undeca-2,4-dienoic acid; nona-2,4-dienoic acid; 4,4'-dimethoxystilbene; 2,5-di(p-ethoxybenzylidene) cyclopentanone; 2,7-di-(benzylidene amino)fluorine; 2-p-methoxybenzylidene aminophenanthrene; 4-methoxy-4"-nitro-p-terphenyl; 4-p-methoxybenzylidene aminodiphenyl; 4,4'-di(benzylidene amino)diphenyl; p-n-hexylbenzoic acid; p-n-propoxybenzoic acid; trans-p-methoxy cinnamic acid; 6-methoxy-2-naphtholic acid; p-phenylene di-p-anisate; p-phenylene di-p-ethoxy benzoate; p-phenylene di-p-n-hexyloxy benzoate; p-phenylene di-p-n-heptyloxybenzoate; p-phenylene di-p-n-octyloxybenzoate; 1,4-dicyclo[2.2.2]octylene di-p-anisate; 1,4-dicyclo[2.2.2]octylene di-p-n-octyloxybenzoate; trans-1,4-cyclohexylene di-p-n-butoxybenzoate; 4,4'-di(p-methoxybenzylidene amino)benzyl; p,p'-diacetoxystilbene; 1,2-di(p-methoxyphenyl)-acetylene; p-(p-acetoxyazo)benzoic acid; 1,4-di-(p-methoxyphenyl)-butadiene; p-anisal-p-anisidine; p,p'-dimethoxybenzal-1,4-naphthalene diamine; p-n-butylbenzoic acid; p,p'-di-n-butyldiphenyl pyridazine; p-(p-cyanobenzal)anisidine; p-(p-methoxy benzoxy)benzoic acid; anisal-p-aminoazobenzene; 1-(4'-anisal amino)-4-phenylazonaphthalene; N-(p-methoxybenzylidene)-p-n-butylaniline; N-(p-n-octyloxybenzylidene)-p-n-butylaniline; p-anisylidene-p-phenylazoaniline; N,N'-dibenzylidenebenzidine; N,N'-di(p-n-hexyloxybenzylidene)benzidine; p-bis(heptyloxy benzoyloxy)benzene; p-n-propoxybenzoic acid; p-n-butoxybenzoic; p-n-amyloxybenzoic acid; p-n-heptyloxybenzoic acid; p-n-octyloxybenzoic acid; butyl-p-(p-ethoxyphenoxycarbonyl)phenylcarbonate; p-(p-ethoxy-phenylazo)phenylheptanoate; 4-[(p-hexyloxycarbonyl oxybenzylidene) amino]-1-pentyloxybenzene; N-p-(pentyloxycarbonyloxy) benzylidene]-p-anisidine; p-[(p-butoxyphenyl)-azo]phenyl butyl carbonate; p-(pentoxyphenylazo)phenyl hexanoate; p-(p-ethoxyphenylazo)phenyl valerate; p-[(p-ethoxylbenzylidene)amino]benzonitrile; p-[(p-methoxybenzylidene) amino]benzonitrile; ethyl p-[(p-methoxybenzylidene) amino]cinnamate; p-(p-ethoxyphenylazo)phenyl crotonate; p-[(p-methoxybenzylidene)amino]-phenyl p-toluate; p-[(p-methoxybenzylidene)amino]-phenyl benzoate; p-[(p-ethoxybenzylidene)amino]phenyl benzoate; N,N'-di(p-methoxybenzylidene)-α,α'-bi-p-toluidine; p-anisalazine; 4-acetoxy-3-methoxycinnamic acid; p-acetoxycinnamic acid; 4'-[(p-pentyl oxycarbonyl oxybenzylidene)aminovalerophenone; diethyl p,p'-azoxy dicinnamate; 4-butoxybenzylidene-4'-aminoacetophenone; 4-decyloxybenzylidene-4'-aminoacetophenone; 4-dodecyloxybenzylidene-4'-aminoacetophenone; 4-heptyloxybenzylidene-4'-aminoacetophenone; 4-hexyloxybenzylidene-4'-aminoacetophenone; 4-methoxybenzylidene-4'-aminoacetophenone; 4-nonyloxybenzylidene-4'-aminoacetophenone; 4-octyloxybenzylidene-4'-aminoacetophenone; 4-pentyloxybenzylidene-4'-aminoacetophenone; 4-propoxybenzylidene-4'-aminoacetophenone; 4-butoxybenzylidene-4'-aminopropiophenone; 4'-aminopropiophenone;

4-ethyloxybenzylidene-4'-aminopropiophenone; 4-hexyloxybenzylidene-4'-aminopropiophenone; 4-methoxybenzylidene-4'-aminopropiophenone; 4-nonyloxybenzylidene-4'-aminopropiophenone; 4'-octyloxybenzylidene-4'-aminopropiophenone; 4-pentyloxybenzylidene-4'-aminopropiophenone; 4-propoxybenzylidene-4'-aminopropiophenone; bis-(4-bromobenzylidene)-2-chloro-1,4-phenylenediamine; bis-(4-chlorobenzylidene)-2-chloro-1,4-phenylenediamine; bis-(4-n-decyloxybenzylidene)-2-chloro-1,4-phenylenediamine; bis-(4-dodecyloxybenzylidene)-2-chloro-1,4-phenylenediamine; bis-(4-n-hexyloxybenzylidene)-2-chloro-1,4-phenylenediamine; bis-(4-methoxybenzylidene)-2-chloro-1,4-phenylenediamine; bis-(4-nonyloxybenzylidene)-2-chloro-1,4-phenylenediamine; bis-(4-n-octyloxybenzylidene)-2-chloro-1,4-phenylenediamine; bis-(4-n-pentyloxybenzylidene)-2-chloro-1,4-phenylenediamine; bis-(4-bromobenzylidene)-1,4-phenylenediamine; bis-(4-chlorobenzylidene)-1,4-phenylenediamine; bis-(4-n-decyloxybenzylidene)-1,4-phenylenediamine; bis-(4-n-dodecyloxybenzylidene)-1,4-phenylenediamine; bis-(4-fluorobenzylidene)-1,4-phenylenediamine; bis-(4-n-heptyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-octyloxybenzylidene)-1,4-phenylenediamine; bis-(4-n-pentyloxybenzylidene)-1,4-phenylenediamine; terephthal-bis-(p-bromoaniline); terephthal-bis-(p-chloroaniline); and terephthal-bis-(p-fluoroaniline); terephthal-bis-(p-iodoaniline). In some embodiments, the liquid crystals are selected from a group comprising: p-azoxyanisol, p-azoxyphenetol, p-butoxybenzoic acid, p-methoxycinnamic acid, butyl-p-anisylidene-p-aminocinnamate, anisylidene p-amino-phenylacetate, p-ethoxybenzalamino-α-methyl-cinnamic acid, 1,4-bis(p-ethoxybenzylidene)cyclohexanone, 4,4'-dihexyloxybenzane, 4-4'diheptyloxybenzene, anisal-p-amino-azobenzene, anisaldazine, α-benzene-azo-(anisal-α'-naphthylamine), n,n'-nonoxybenzetoluidine, anilines of the generic group (p-n-alkoxybenzylidene-p-n-alkylanilines), such as p-methoxybenzylidene p'-n-butylaniline, p-n-butoxybenzylidene-p'-aminophenylacetate, p-n-octoxybenzylidene-p'-aminophenylacetate, p-n-benzylidene propionate-p'-aminophenylmethoxide, p-n-anisylidene-p'-aminophenylbutyrate, p-n-butoxybenzylidene-p'-aminophenylpeatoate and mixtures thereof. Useful conjugate cyano organic compounds are 7,7',8,8'-tetracyanokinodimethane (TCNQ), (2,4,7-trinitro-9-fluoroenylidene)-malono-nitrile (TFM), p-[N-(p'-methoxybenzylidene)amino]-n-butylbenzene (MBBA), p-[N-(p'-ethoxybenzylidene)amino]butylbenzene (EBBA), p-[N-(p'-methoxybenzylidene)amino]phenyl butyrate, n-butyl-p-(p'-ethoxyphenoxycarbonyl)phenylcarbonate, p-methoxy-p'-n-butylazoxybenzene, p-ethoxy-p'-n-butylazobenzene, p-[N-(p'-methoxybenzylidene)amino]benzonitrile (BBCA), p-[N-(p'-hexylbenzylidene)amino]benzonitrile (HBCA), pentylphenylmethoxy benzoate, pentylphenylpentyloxy benzoate, cyanophenylpentyl benzoate, cyanophenylpentyloxy benzoate, cyanophenylheptyloxy benzoate, cyanophenyloctyloxy benzoate, and cyanophenylmethoxy benzoate.

In some embodiments, the liquid includes monomers that are distinct from the liquid crystals. Immobilizing the liquid crystals includes polymerizing the monomers.

In accordance with some embodiments, a lens includes immobilized liquid crystals (e.g., lens 320 in FIG. 2D). The liquid crystals in a first region are aligned in a first orientation (e.g., region 326 in FIG. 2C). The liquid crystals in a second region, located between the first region and a third region and adjacent to the first region and the third region, are aligned in a second orientation that is distinct from the first orientation (e.g., region 327 in FIG. 2C). The liquid crystals in the third region, located between the second region and a fourth region and adjacent to the second region and the fourth region, are aligned in the first orientation (e.g., region 328 in FIG. 2C). The liquid crystals in the fourth region, located adjacent to the third region, are aligned in the second orientation (e.g., region 329 in FIG. 2C).

In some embodiments, the liquid crystals in the first region are aligned parallel to a first substrate of the two substrates. The liquid crystals in the second region are aligned perpendicular to the first substrate. The liquid crystals in the third region are aligned parallel to the first substrate. The liquid crystals in the fourth region are aligned perpendicular to the first substrate. For example, in FIG. 2C, liquid crystals in first region 326 and fourth region 328 are aligned parallel to the substrate and liquid crystals in second region 327 and fourth region 329 are aligned perpendicular to the substrate.

In some embodiments, the first region has a first refractive index and the second region has a second refractive index so that the difference between the first refractive index and the second refractive index causes a half-wave phase difference for the impinging light.

In some embodiments, the aligned liquid crystals are configured to focus a portion of light impinging on the lens and disperse a portion if light impinging on the lens.

In some embodiments, spacing between two adjacent regions in which the liquid crystals are aligned in a same orientation is determined based on a distance from a center of the substrate (e.g., spacing between regions 326 and 328 in FIG. 2C is determined based on a distance from a center of the substrate, as explained with respect to FIG. 2D).

In some embodiments, two adjacent regions, in which the liquid crystals are aligned in the first orientation, located at a first distance from a center of the substrate are separated by a first spacing (e.g., low index regions at the distance $r_1$ from the center of the substrate are separated by $d_1$). Two adjacent regions, in which the liquid crystals are aligned in the first orientation, located at a second distance from the center of the substrate are separated by a second spacing (e.g., low index regions at the distance $r_2$ from the center of the substrate are separated by $d_2$). The second distance is greater than the first distance (e.g., $r_2 > r_1$). The second spacing is less than the first spacing (e.g., $d_2 < d_1$).

In accordance with some embodiments, a device includes any lens described herein (e.g., display device 300 in FIG. 3A includes lens 320). The device also includes an array of light emitting devices coupled with the lens for outputting light through the lens (e.g., light emission device array 310).

In some embodiments, the device is a head-mounted display device.

In accordance with some embodiments, an instrument for making a liquid crystal lens includes a hollow container. The container includes a first substrate including a plurality of electrodes and a second substrate including a plurality of electrodes. A respective electrode on the first substrate is aligned with a corresponding electrode on the second substrate. The first substrate is separable from the second substrate. The hollow container, when the first substrate is coupled with the second substrate, is configured to hold sealingly liquid that includes liquid crystals. The plurality of electrodes for the first substrate includes a first set of electrodes and a second set of electrodes that is distinct from the first set of electrodes. The plurality of electrodes for the second substrate includes a third set of electrodes and a fourth set of electrodes that is distinct from the third set of electrodes. The instrument also includes a voltage source configured to apply a first voltage differential across the first set of electrodes and the third set of electrodes and a second voltage differential across the second set of electrodes and the fourth set of electrodes.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A diffractive lens, comprising:
immobilized liquid crystals, wherein:
   the liquid crystals in a first region are aligned in a first orientation;
   the liquid crystals in a second region, located between the first region and a third region and adjacent to the first region and the third region, are aligned in a second orientation that is distinct from the first orientation;
   the liquid crystals in the third region, located between the second region and a fourth region and adjacent to the second region and the fourth region, are aligned in the first orientation; and
   the liquid crystals in the fourth region, located adjacent to the third region, are aligned in the second orientation, wherein the first region and the third region are spaced apart to cause diffraction of impinging light.

2. The lens of claim 1, wherein:
the liquid crystals are located between two substrates;
the liquid crystals in the first region are aligned parallel to a first substrate of the two substrates;
the liquid crystals in the second region are aligned perpendicular to the first substrate;
the liquid crystals in the third region are aligned parallel to the first substrate; and
the liquid crystals in the fourth region are aligned perpendicular to the first substrate.

3. The lens of claim 1, wherein:
the first region has a first refractive index and the second region has a second refractive index so that the difference between the first refractive index and the second refractive index causes a half-wave phase difference for the impinging light.

4. The lens of claim 1, wherein:
the aligned liquid crystals are configured to focus a portion of light impinging on the lens and disperse a portion of light impinging on the lens.

5. The lens of claim 1, wherein:
the liquid crystals are located on a substrate; and
spacing between two adjacent regions in which the liquid crystals are aligned in a same orientation is determined based on a distance from a center of the substrate.

6. The lens of claim 1, wherein:
the liquid crystals are located on a substrate;
two adjacent regions, in which the liquid crystals are aligned in the first orientation, located at a first distance from a center of the substrate are separated by a first spacing;
two adjacent regions, which the liquid crystals are aligned in the first orientation, located at a second distance from the center of the substrate are separated by a second spacing;
the second distance is greater than the first distance; and
the second spacing is less than the first spacing.

7. The lens of claim 1, wherein:
the aligned liquid crystals in the first region are configured to direct light to a particular focal point;
the aligned liquid crystals in the second region are configured to direct light to the particular focal point;
the aligned liquid crystals in the third region are configured to direct light to the particular focal point; and
the aligned liquid crystals in the fourth region are configured to direct light to the particular focal point.

8. A device, comprising:
the lens of claim 1; and
an array of light emitting devices coupled with the lens for outputting light through the lens.

9. The device of claim 8, wherein the device is a head-mounted display device.

10. The device of claim 8, wherein:
the lens is configured to receive light output from the array of light emitting devices, wherein:
   a portion of light impinging on the first region is directed to a particular focal point;
   a portion of light impinging on the second region is directed to the particular focal point;
   a portion of light impinging on the third region is directed to the particular focal point; and
   a portion of light impinging on the fourth region is directed to the particular focal point.

* * * * *